(12) United States Patent
Göransson

(10) Patent No.: US 11,394,440 B2
(45) Date of Patent: Jul. 19, 2022

(54) CONFIGURING A BEAM DIRECTION OF A SET OF ANTENNAS

(71) Applicant: Telefonaktiebolaget LM Ericsson (publ), Stockholm (SE)

(72) Inventor: Bo Göransson, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/054,934

(22) PCT Filed: May 16, 2018

(86) PCT No.: PCT/SE2018/050504
§ 371 (c)(1),
(2) Date: Nov. 12, 2020

(87) PCT Pub. No.: WO2019/221649
PCT Pub. Date: Nov. 21, 2019

(65) Prior Publication Data
US 2021/0258053 A1    Aug. 19, 2021

(51) Int. Cl.
*H04B 7/06*       (2006.01)
*H04W 16/28*   (2009.01)

(52) U.S. Cl.
CPC .......... *H04B 7/0617* (2013.01); *H04W 16/28* (2013.01)

(58) Field of Classification Search
CPC .............................. H04B 7/0617; H04W 16/28
See application file for complete search history.

(56) References Cited

U.S. PATENT DOCUMENTS

| | | | |
|---|---|---|---|
| 9,413,474 B2* | 8/2016 | Chai | H04B 7/0452 |
| 2010/0134359 A1* | 6/2010 | Manholm | H01Q 21/22 |
| | | | 343/700 R |
| 2013/0093624 A1* | 4/2013 | Raczkowski | H01Q 3/42 |
| | | | 342/368 |

(Continued)

FOREIGN PATENT DOCUMENTS

WO     2017/018631 A1     2/2017

OTHER PUBLICATIONS

International Search Report and Written Opinion issued in International Application No. PCT/SE2018/050504 dated Feb. 12, 2019 (12 pages).

(Continued)

*Primary Examiner* — Jaison Joseph
(74) *Attorney, Agent, or Firm* — Rothwell, Figg, Ernst & Manbeck, P.C.

(57) ABSTRACT

It is provided a method for configuring a beam direction of a set of antennas of an antenna site for a radio communication system. The method being performed in a beam direction configurer and comprises the steps of: obtaining a desired beam direction; configuring a coarse beam director, being configurable to provide only a fixed number of beam directions for the set of antennas, to provide a beam direction being closest to the desired beam direction; and configuring a fine beam director, being configurable more finely than the coarse beam director, to be in a fine beam direction such that a resulting beam direction for set of antennas, being a combination of the beam direction of the coarse beam director and the fine beam director, corresponds to the desired beam direction.

20 Claims, 5 Drawing Sheets

(56) References Cited

U.S. PATENT DOCUMENTS

| | | | |
|---|---|---|---|
| 2016/0241323 A1* | 8/2016 | Ko | H04B 7/0452 |
| 2017/0163326 A1* | 6/2017 | Kim | H04B 7/0639 |
| 2017/0366242 A1* | 12/2017 | Lee | H04B 7/0408 |
| 2018/0227022 A1* | 8/2018 | Kim | H04B 7/0478 |
| 2019/0223033 A1* | 7/2019 | Nam | H04B 7/0805 |

OTHER PUBLICATIONS

Seong-Won Go et al., "Hybrid Beamforming for Large Scale Array Antenna in Wireless Ultra-wide Area Backhaul Network", IEEE, Jun. 4, 2017 (pp. 1-6).
Carl B. Dietrich, Jr., Adaptive Arrays and Diversity Antenna Configurations for Handheld Wireless Communication Terminals, Chapter 3: Antenna Arrays and Beamforming, PhD Thesis, Blacksburg, Virginia, 2000, available at: https://vechworks.lib.vt.edu/handle/10919/27291 (36 pages).

\* cited by examiner

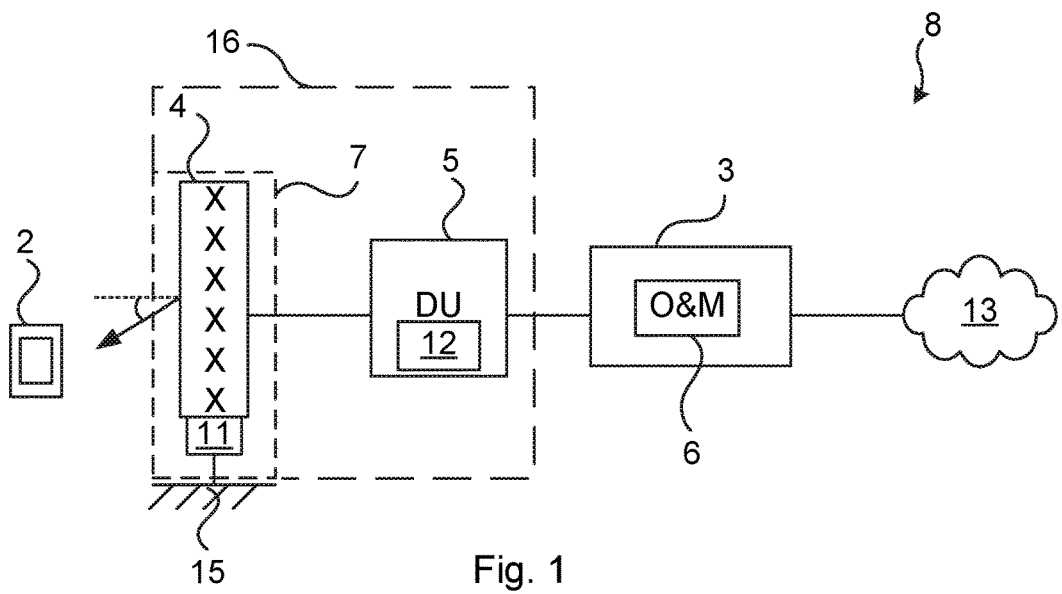
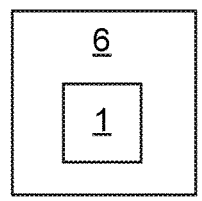
Fig. 2A
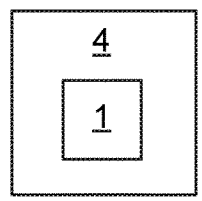
Fig. 2B
Fig. 2C
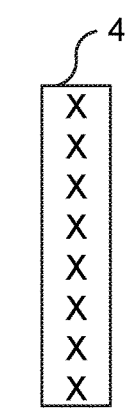
Fig. 3A
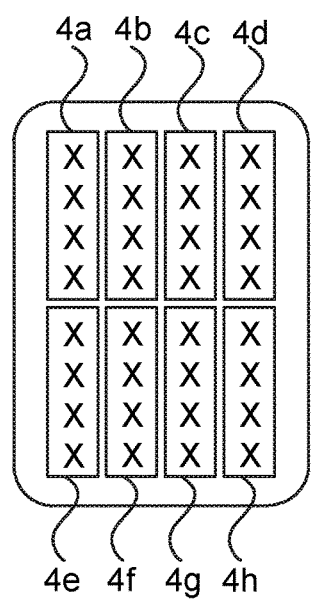
Fig. 3B

CONFIGURING A BEAM DIRECTION OF A SET OF ANTENNAS

CROSS REFERENCE TO RELATED APPLICATION(S)

This application is a 35 U.S.C. § 371 National Stage of International Patent Application No. PCT/SE2018/050504, filed May 16, 2018, designating the United States.

TECHNICAL FIELD

The invention relates to a method, beam direction configurer, a computer program and a computer program product for configuring a beam direction of a set of antennas.

BACKGROUND

Being able to configure a beam direction is one aspect of great importance for modern antenna systems. For instance, tilt (i.e. vertical beam direction) of antennas is configured as part of cell configuration. Modern antennas provide a Remote Electrical Tilt (RET) system, where the direction of the vertical beam can be changed to optimise network performance.

In a traditional deployment, two ports are provided by each antenna column, one per polarization. For AAS (Active Antenna Systems) or FD-MIMO (Full Dimension Multiple Input Multiple Output) systems, the number of ports is expanded to a larger number (e.g. 16, 32 or 64) by dividing each antenna column into sub-arrays, where each sub-array is fed by an active radio port per polarization.

However, RET becomes very complicated, space consuming and costly when applied for a large number of antenna ports.

SUMMARY

It is an object to provide an improved way of providing beam configuration for a set of antennas.

According to a first aspect, it is provided a method for configuring a beam direction of a set of antennas of an antenna site for a radio communication system. The method being performed in a beam direction configurer and comprises the steps of: obtaining a desired beam direction; configuring a coarse beam director, being configurable to provide only a fixed number of beam directions for the set of antennas, to provide a beam direction being closest to the desired beam direction; and configuring a fine beam director, being configurable more finely than the coarse beam director, to be in a fine beam direction such that a resulting beam direction for set of antennas, being a combination of the beam direction of the coarse beam director and the fine beam director, corresponds to the desired beam direction.

The coarse beam director may be an analogue beam director.

The coarse beam director may be based on configuring the beam direction for the set of antennas by different phase shifts.

The coarse beam director may comprise a set of selectively applied time delay elements.

The fine beam director may be a digital domain beam director.

The fine beam director may provide a general offset to a digital domain beamforming calculation in baseband processing, the general offset being applied for all communication channels for which the set of antennas are used.

The fine beam director may provide an adjustment in digital domain radio frequency, RF, processing.

The fine beam director may provide an adjustment in digital domain intermediate frequency, IF, processing.

The fine beam director may provide an adjustment in digital domain baseband processing.

The beam direction may be a vertical beam direction.

The fixed number of beam directions may be less than ten.

The set of antennas may form part of an active antenna system, AAS.

The beam direction may be applied for all communication channels for which the set of antennas are used.

The method may be repeated for a plurality of sets of antennas, whereby different resulting beam directions are provided for different sets of antennas.

According to a second aspect, it is provided a beam direction configurer for configuring a beam direction of a set of antennas of an antenna site for a radio communication system. The beam direction configurer comprises: a processor; and a memory storing instructions that, when executed by the processor, cause the beam direction configurer to: obtain a desired beam direction; configure a coarse beam director, being configurable to provide only a fixed number of beam directions for the set of antennas, to provide a beam direction being closest to the desired beam direction; and configure a fine beam director, being configurable more finely than the coarse beam director, to be in a fine beam direction such that a resulting beam direction for set of antennas, being a combination of the beam direction of the coarse beam director and the fine beam director, corresponds to the desired beam direction.

The coarse beam director may be an analogue beam director.

The coarse beam director may be based on configuring the beam direction for the set of antennas by different phase shifts.

The coarse beam director may comprise a set of selectively applied time delay elements.

The fine beam director may be a digital domain beam director.

The fine beam director may provide a general offset to a digital domain beamforming calculation in baseband processing, the general offset being applied for all communication channels for which the set of antennas are used.

The fine beam director may provide an adjustment in digital domain radio frequency, RF, processing.

The fine beam director may provide an adjustment in digital domain intermediate frequency, IF, processing.

The fine beam director may provide an adjustment in digital domain baseband processing.

The beam direction may be a vertical beam direction.

The fixed number of beam directions may be less than ten.

The set of antennas form part of an active antenna system, AAS.

The beam direction may be applied for all communication channels for which the set of antennas are used.

The beam direction configurer may be configured to be applied for a plurality of sets of antennas, whereby different resulting beam directions are provided for different sets of antennas.

According to a third aspect, it is provided a beam direction configurer comprising: means for obtaining a desired beam direction of a set of antennas of an antenna site for a radio communication system; means for configuring a coarse beam director, being configurable to provide only a fixed number of beam directions for the set of antennas, to provide a beam direction being closest to the desired beam direction; and means for configuring a fine beam director, being configurable more finely than the coarse beam director, to be in a fine beam direction such that a resulting beam direction for set of antennas, being a combination of the beam direction of the coarse beam director and the fine beam director, corresponds to the desired beam direction.

According to a fourth aspect, it is provided a computer program for configuring a beam direction of a set of antennas of an antenna site for a radio communication system. The computer program comprises computer program code which, when run on a beam direction configurer causes the beam direction configurer to: obtain a desired beam direction; configure a coarse beam director, being configurable to provide only a fixed number of beam directions for the set of antennas, to provide a beam direction being closest to the desired beam direction; and configure a fine beam director, being configurable more finely than the coarse beam director, to be in a fine beam direction such that a resulting beam direction for set of antennas, being a combination of the beam direction of the coarse beam director and the fine beam director, corresponds to the desired beam direction.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic diagram illustrating a radio communication system in which embodiments presented herein can be applied;

FIGS. 2A-C are schematic diagrams illustrating embodiments of where a beam direction configurer, for use in the environment of FIG. 1, can be implemented.

FIGS. 3A and 3B illustrate various embodiments of sets of antennas for use with the beam direction configurer of FIGS. 2A-C;

DETAILED DESCRIPTION

Figure 4A:
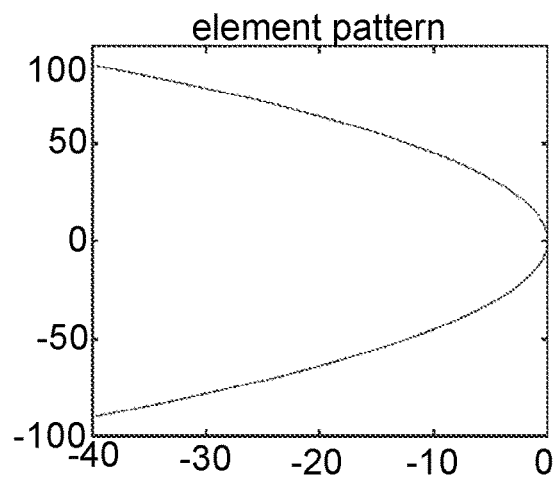
FIGS. 4A-D are schematic graphs illustrating antenna gain characteristics for different sizes of antenna sets.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on configuring a direction of a set of antennas by configuring both a coarse beam director and a fine beam director. In this way, the effect of grating lobes is greatly reduced. This is particularly applicable for situations where sets of antennas are provided at an effective distance from each other (in relation to the wavelength $\lambda$) such that the configuration range of the fine beam director is limited due to grating lobes.

FIG. 1 is a schematic diagram illustrating a radio communication system 8 in which embodiments presented herein can be applied. The radio communication system 8 is here exemplified as a cellular communication network 8, comprising a core network 3 and one or more radio network nodes 16, here in the form of radio base stations being evolved Node Bs, also known as eNode Bs or eNBs. The radio network node 16 could also be in the form of g Node Bs, Node Bs, BTSs (Base Transceiver Stations) and/or BSSs (Base Station Subsystems), etc. The radio network node 16 provides radio connectivity over a wireless interface to wireless devices 2. The term wireless device is also known as mobile communication terminal, user equipment (UE), mobile terminal, user terminal, user agent, wireless terminal, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless device 2 can comprise a number of wires for internal and/or external purposes.

The radio network node 16 is optionally split in a digital unit 5 and a radio unit 7 provided at an antenna site 15. This allows the digital unit 5 and radio unit 7 to be provided in different locations.

The radio unit 7 comprises a coarse beam director 11 for configuring a beam direction in one of a fixed number (i.e. a limited, finite number) of beam directions. This direction control is provided for all communication (both transmission and reception) using the radio unit 7. The coarse beam director can be any suitable beam director, which can be of a simple implementation since a continuous set of directions do not need to be implemented. For instance, the coarse beam director can be implemented using a configurable set of time delay elements causing phase delays. The time delay elements can be based on a True Time Delay (TTD) unit where the time delay between the antenna branches is changed either by having different path lengths and/or using different materials with different dielectric properties. The phase delays can be selectively applied e.g. using a Butler matrix or any other suitable distribution structure, as known in the art per se. Alternatively or additionally, an RET (Remote Electrical Tilt) system could be used for the coarse beam director. The RET system comprises a phase shifter, and can be implemented using TTD. The time delay between the branches can be changed by physically moving a rod attached to a step motor. Since only a few steps need to be provided, the step motor can be of a relatively simple type. Once configured, the RET does not need to be changed until a reconfiguration is triggered, which can be weeks, months or years later.

The radio unit 7 comprises one or more sets of antennas 4, which is shown further in FIGS. 3A-B and is explained in more detail below.

The digital unit 5 can perform beamforming as known in the art per se, where such beamforming is performed per communication channel. The digital unit 5 comprises a fine beam director 12 for configuring the beam direction of the set 4 of antennas more finely. When applied for the set 4 of antennas, the beam directions from the coarse beam director and from the fine beam director 12 are combined to a resulting beam direction for the set of antennas. In this way, the coarse beam director can be configured to be as close as possible to a desired beam direction, and the fine beam director is configured to be adjusted (by adding or removing a direction) in relation to the coarse beam direction to achieve the desired beam direction. This is particularly useful when the fine beam director has a limited angular range, as explained in more detail below.

The cellular communication network 8 may e.g. comply with any one or a combination of 5G NR (New Radio), LTE (Long Term Evolution), LTE-Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Over the wireless interface, downlink communication occurs from the radio network node 16 to the wireless device 2 and uplink communication occurs from the wireless device 2 to the radio network node 16. The quality of the wireless radio interface to each wireless device 2 can vary over time and depending on the position of the wireless device 2, due to effects such as fading, multipath propagation, interference, etc.

The radio network node 16 is also connected to the core network 3 for connectivity to central functions, such as an operation and maintenance (O&M) system 6. The O&M system 6 can be used for monitoring and configuring various parts the cellular communication network 8. The core network 3 also provides connectivity to a wide area network 13, such as the Internet.

FIGS. 2A-C are schematic diagrams illustrating embodiments of where a beam direction configurer 1, for use in the environment of FIG. 1, can be implemented.

In FIG. 2A, the beam direction configurer 1 is shown as implemented in the O&M system 6. The O&M system 6 is thus the host device for the beam direction configurer 1 in this implementation.

In FIG. 2B, the beam direction configurer 1 is shown as implemented in the set of antennas. The set of antennas is thus the host device for the beam direction configurer 1.

In FIG. 2C, the beam direction configurer 1 is shown as implemented as a stand-alone device. The beam direction configurer 1 thus does not have a host device in this implementation.

FIGS. 3A and 3B illustrate various embodiments of sets of antennas for use with the beam direction configurer of FIGS. 2A-C.

In FIG. 3A, there is a single set 4 of antennas with eight cross-polarised antenna element pairs. This is a traditional single column antenna where all antenna elements form part of a single 8×1 sub-array.

In FIG. 3B, there are eight sets 4a-h of antennas, each comprising four cross-polarised antenna pairs. Each set 4a-h is also known as a sub-array. In other words, each of the sets 4a-h is a 4×1 sub-array.

Figure 4B:
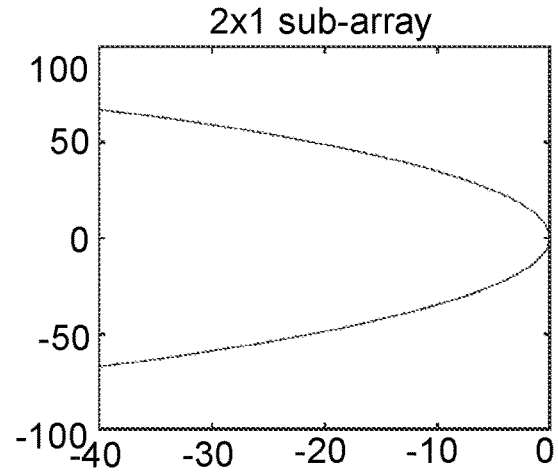
Figure 4C:
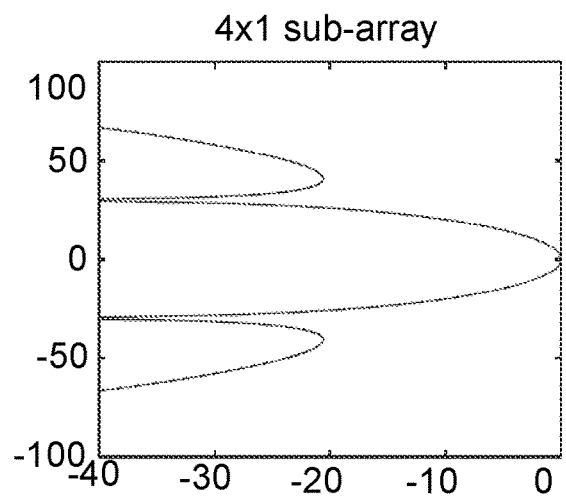
Figure 4D:
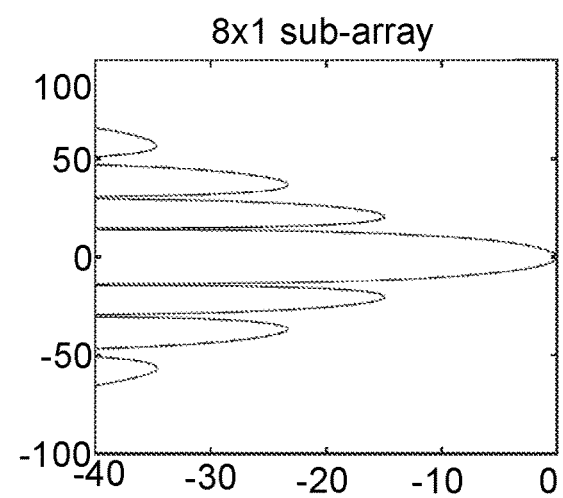

FIGS. 4A-D are schematic graphs illustrating antenna gain characteristics for different sizes of antenna sets. The horizontal axis indicates gain and the horizontal axis indicates angle. FIG. 4A illustrates the antenna characteristics for a single antenna element. FIG. 4B illustrates the antenna characteristics for a 2×1 sub-array. FIG. 4C illustrates the antenna characteristics for a 4×1 sub-array. FIG. 4D illustrates the antenna characteristics for a 8×1 sub-array.

If the sub-array consists of only one element, as illustrated in FIG. 4A, tilting can be done in digital domain by phase shifting signals feed to each port. However, when the size of the sub-array contains more elements, the resulting sub-array beam (main beam at 0 degrees) becomes narrower and hence the tilt possibilities are more restricted. Still, to optimize the coverage area, the beam provided by each sub-array needs to be configured with a certain tilt.

When the number of ports is increased by dividing the column into sub-arrays, as illustrated in FIG. 3B, providing an analogue tilt system, such as RET, becomes very bulky. To fit e.g. 16 or 32 of these behind the panel is very challenging. It will also increase the cost, weight and complexity considerably.

In embodiments presented herein, these problems are solved by combining a coarse direction configuration, e.g. RET based, and a fine direction configuration, e.g. in the digital domain.

Figure 5A:
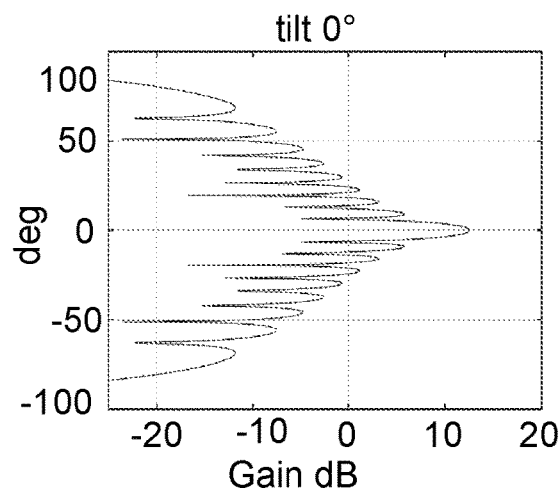
FIGS. 5A-D are schematic graphs illustrating antenna gain characteristics for an antenna array with three sub-arrays of six stacked elements, where no course beam direction is applied.
Figure 5B:
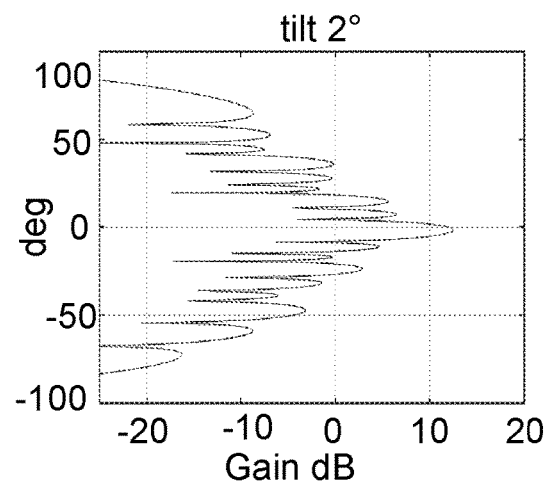
Figure 5C:
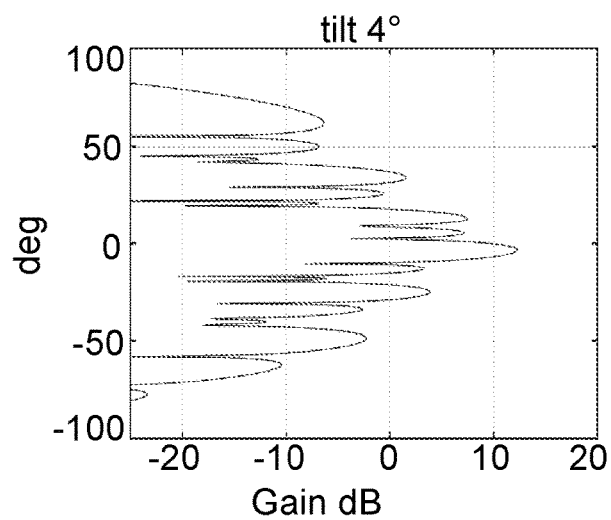
Figure 5D:
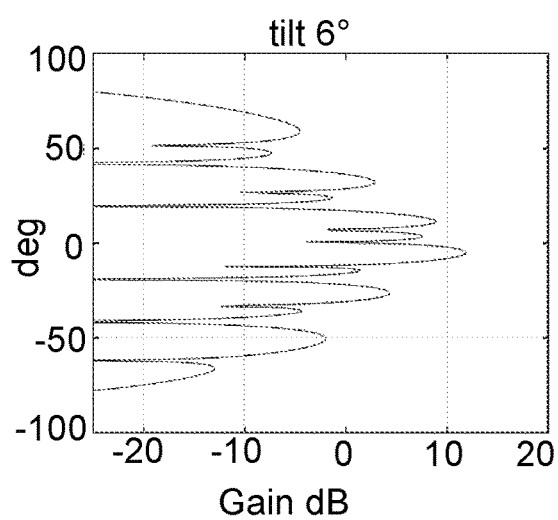
Figure 6A:
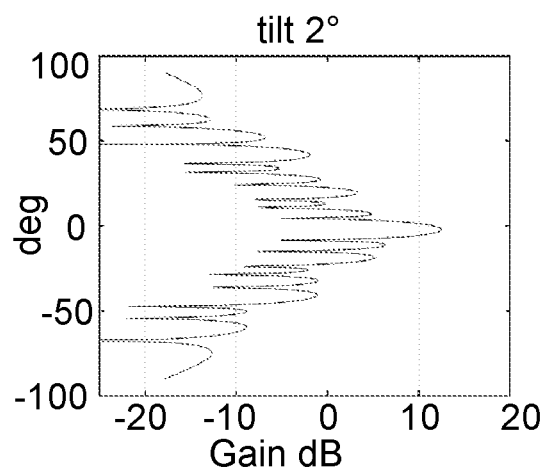
FIGS. 6A-D are schematic graphs illustrating antenna gain characteristics for an antenna array with three sub-arrays of six stacked elements, where a both a coarse beam direction configuration and a fine beam direction configuration are applied.
Figure 6B:
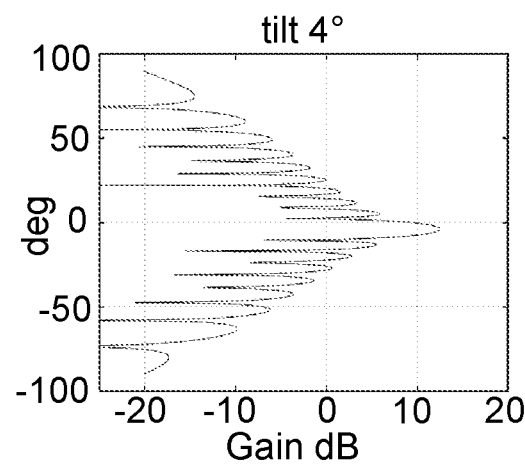
Figure 6C:
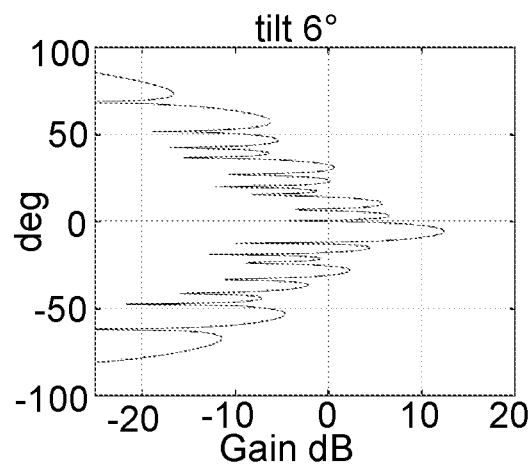
Figure 6D:
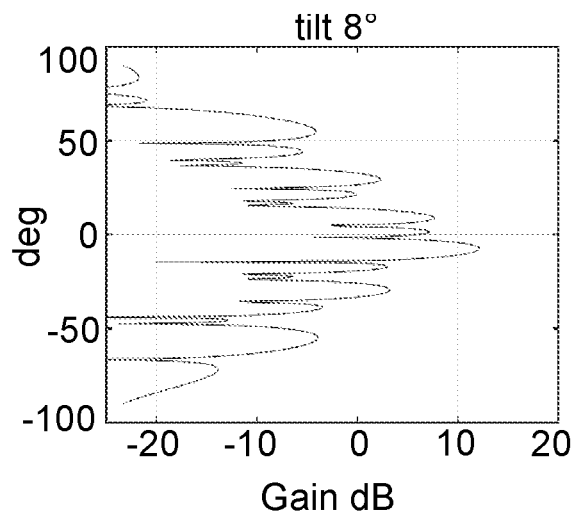

FIGS. 5A-D are schematic graphs illustrating antenna gain characteristics for an antenna array with three sub-arrays of six stacked elements, where no course beam direction is applied. In FIG. 5A, no digital tilt is applied. In FIG. 5B, a digital tilt of 2 degrees is applied. In FIG. 5C, a digital tilt of 4 degrees is applied. In FIG. 5D, a digital tilt of 6 degrees is applied.

When the distance between the phase centres of sub-arrays is greater than $\lambda/2$ (where κ is the wavelength), and an appreciable digital tilt is applied to the signals fed to the sub-arrays, grating lobes occur. These occur due to insufficient spatial resolution between sub-arrays, analogous to under-sampling of a signal in the time domain. A grating lobe is a side lobe with an amplitude in the vicinity of the main lobe, most visibly seen in FIG. 5D but also in FIG. 5C and even FIG. 5B. For AAS systems, the phase centers between the sub-arrays (in vertical domain) is much larger than $\lambda/2$, which is needed to provide grating lobe free steering over 180°. When the separation between individual antenna elements within a sub-array is $\lambda/2$ and the sub-array consist of 6 elements, the corresponding distance between the phase centers will be $6*\lambda/2=3\lambda$, assuming the same distance between sub-arrays as between elements. The resulting array of sub-arrays can now be seen as a new array having the resulting sub-array pattern as element pattern. This new array will have much smaller grating lobe free tilt range as displayed in FIGS. 5A-D.

It can be seen in FIG. 5C, that a tilt of 4 degrees results in severe grating lobes. However, within each sub-array it is possible to have a large tilt angle since the spacing between antenna elements is kept small ($\lambda/2$ in this example).

Hence, it is proposed that a total (large) tilt range can be obtained by tilting each sub-array with a course beam direction configurer and then fine adjust this with a fine beam direction configurer which can be provided between the sub-array ports. The fine beam direction configurer can just provide a few degrees of tilt (without causing significant grating lobes), such that when both the coarse and fine beam direction configurations are applied, a continuous tilt can be achieved.

FIGS. 6A-D are schematic graphs illustrating antenna gain characteristics for an antenna array with three sub-arrays of six stacked elements, where a both a coarse beam direction configuration and a fine beam direction configuration are applied.

The graphs of FIGS. 6A-D are applied for the same situation as for FIG. 5A-D. But this time, we assume a four degree coarse beam direction configuration on each sub-array, in addition to the fine beam direction configuration provided between the sub-array ports.

Now, note that if a continuous tilt range of say 15° is required, this can be achieved with a very simple analog tilt per sub-array (forming the coarse beam direction configurer) plus a digital tilt (forming the fine beam direction configurer) between sub-arrays. Only a few fixed values per sub-array, in the coarse beam direction configurer, are needed. For example, the coarse beam direction configurer can be implemented using a fixed beamforming network providing sub-array tilts of [3, 6, 9, 12]° and all values in between are controlled by the digital beamforming between sub-arrays. A few fixed beams can be provided by e.g. a Butler network, a switch network with variable time delays or in any suitable way.

While the examples of FIGS. 4A-D, 5A-D and 6A-D are described in terms of tilt, being a beam direction configuration in a vertical (elevation) direction, the same principles can be applied in the azimuth domain, i.e. a beam direction configuration in a horizontal direction.

Figure 7:
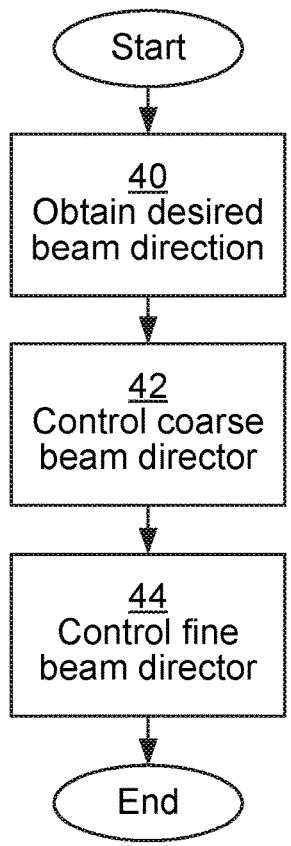
FIG. 7 is a flow chart illustrating embodiments of methods for configuring a beam direction of a set of antennas of an antenna site for a radio communication system.

FIG. 7 is a flow chart illustrating embodiments of methods for configuring a beam direction of a set of antennas of an antenna site for a radio communication system. The method is performed in a beam direction configurer. The set of antennas form part of an active antenna system, AAS. For instance, the set of antennas can be a sub-array of an antenna array (see 4a-h of FIG. 3B). The beam direction can be a vertical beam direction. The beam direction can be applied for all communication channels for which the set of antennas are used.

In an obtain desired beam direction step 40, the beam direction configurer obtains a desired beam direction. The desired beam direction can be obtained from another system (e.g. the O&M system 6 of FIG. 1).

In a configure coarse beam director step 42, the beam direction configurer configures a coarse beam director. The coarse beam director is configurable to provide only a fixed number of beam directions for the set of antennas. The configuration of the coarse beam director is performed to provide a beam direction being closest to the desired beam direction.

As explained above, the coarse beam director can be an analogue beam director. For instance, the coarse beam director can be based on configuring the beam direction for the set of antennas by different phase shifts, which can be implemented using a set of selectively applied time delay elements. As described above, the time delay elements can be analogue delay elements, based on a path length and/or material with certain dielectric properties.

The fixed number of beam directions can be less than ten, to reduce complexity. An increased in the number of coarse beam directions that need to be supported increases complexity, and thus cost and reliability.

In a configure fine beam director step 44, the beam direction configurer configures a fine beam director. The fine beam director is configurable more finely than the coarse beam director. The fine beam director is configured to be in a fine beam direction such that a resulting beam direction for set of antennas, being a combination of the beam direction of the coarse beam director and the fine beam director, corresponds to the desired beam direction.

The fine beam director can be a digital domain beam director. This reduces mechanical complexity and thus cost, while still providing a fine granularity of configuration.

In one embodiment, the fine beam director provides a general offset to a digital domain (communication channel specific) beamforming calculation in baseband processing. The general offset is applied for all communication channels for which the set of antennas are used. When beamforming is applied for some communication channels individually, applying the general offset does not involve any extra hardware components and can be implemented easily by modifying the calculations for beamforming. The beamforming can be applied for a single polarisation or for double polarisations.

In one embodiment, the fine beam director provides an adjustment in digital domain radio frequency, RF, processing. This can be implemented by using different time delays in the DAC (digital-to-analogue converter).

In one embodiment, the fine beam director provides an adjustment in digital domain intermediate frequency, IF, processing, e.g. using different time delays in the DAC. In different transmitter implementations, conversion to RF may be performed in one step (no IF) or several steps (including IF). For example, going directly from baseband to e.g. 30 GHz is difficult, at which point the use of an intermediate step (IF) can be beneficial or necessary. In such an embodiment, there is a conversion from digital baseband to (analogue) IF and then to (analogue) RF.

The method can be applied (sequentially or in parallel) for a plurality of sets (see 4a-h of FIG. 3B) of antennas, whereby different resulting beam directions can be provided for different sets of antennas.

It is to be noted that beam directions can be applied separately for different polarisations of the sets of antennas. This gives great flexibility in how to form beams for different polarisations.

Figure 8:
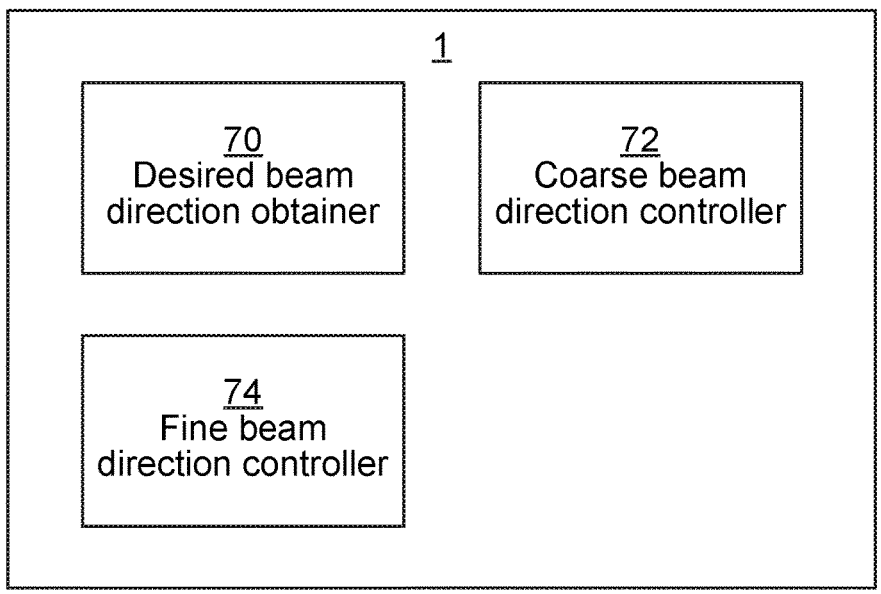
FIG. 8 is a schematic diagram showing functional modules of the beam direction configurer of FIGS. 2A-C according to one embodiment.

FIG. 8 is a schematic diagram showing functional modules of the beam direction configurer 1 of FIGS. 2A-C according to one embodiment. The modules are implemented using software instructions such as a computer program executing in the beam direction configurer. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 7.

A desired beam direction obtainer 70 corresponds to step 40 of FIG. 7. A coarse beam direction configurer 72 corresponds to step 42 of FIG. 7. A fine beam direction configurer 74 corresponds to step 44 of FIG. 7.

Figure 9:
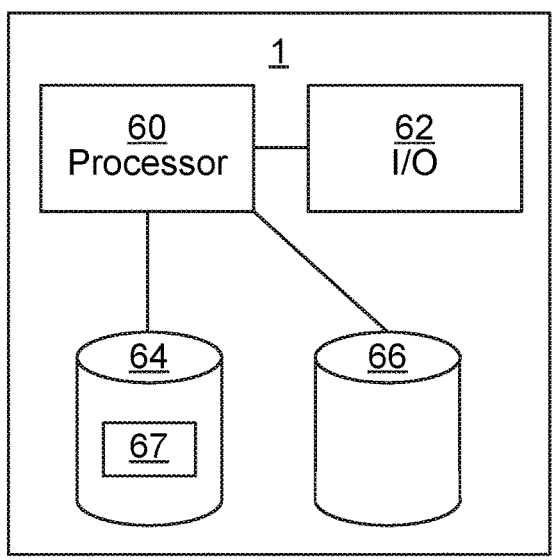
FIG. 9 is a schematic diagram illustrating components of the beam direction configurer of FIGS. 2A-C according to one embodiment.

FIG. 9 is a schematic diagram illustrating components of the beam direction configurer 1 of FIGS. 2A-C according to one embodiment. It is to be noted that one or more of the mentioned components can be shared with the host device (See FIGS. 2A-B), when applicable. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 7 above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 6o. The data memory 66 can be any combination of RAM and/or ROM.

The beam direction configurer 1 further comprises an I/O interface 62 for communicating with external and/or internal entities.

Other components of the beam direction configurer 1 are omitted in order not to obscure the concepts presented herein.

Figure 10:
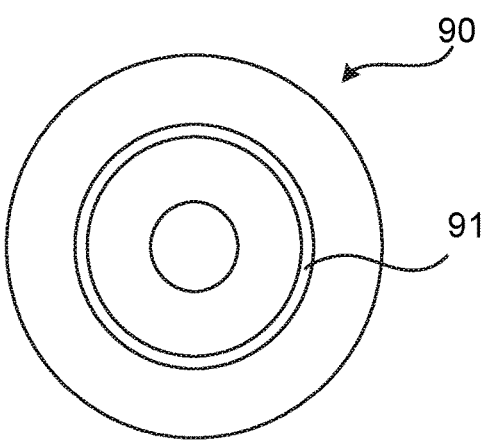
FIG. 10 shows one example of a computer program product comprising computer readable means.

FIG. 10 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 9. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for configuring a tilt of a set of antennas of an antenna site for a radio communication system, the method comprising:
obtaining a desired tilt;
configuring a coarse tilt director, being configurable to provide only a fixed number of tilts for the set of antennas, to provide a coarse tilt being closest to the desired tilt, wherein the set of antennas comprises a first column of antenna elements and a second column of antenna elements, the first column of antenna elements comprising a first sub-array of antenna elements and a second sub-array antenna elements, the second column of antenna elements comprising a third sub-array of antenna elements and a fourth sub-array antenna elements, the phase center of the first sub-array of antenna elements and the phase center of the second sub-array of antenna elements is spaced apart more than $\lambda/2$ in a vertical domain, the phase center of the third sub-array of antenna elements and the phase center of the fourth sub-array of antenna elements is spaced apart more than $\lambda/2$ in the vertical domain, and $\lambda$ is a predetermined wavelength; and
configuring a fine tilt director, being configurable more finely than the coarse tilt director, to provide a fine tilt such that a resulting tilt for the set of antennas, being a combination of the coarse tilt and the fine tilt, corresponds to the desired tilt, wherein
the fine tilt director provides a general offset to a digital domain beamforming calculation in baseband processing, and the method further comprises applying the general offset for a communication channel for which the set of antennas is used.

2. The method of claim 1, wherein the coarse tilt director is an analogue tilt director.

3. The method of claim 2, wherein the coarse tilt director is based on configuring the tilt for the set of antennas by different phase shifts.

4. The method of claim 2, wherein the coarse tilt director comprises a set of selectively applied time delay elements.

5. The method of claim 1, wherein the fine tilt director is a digital domain tilt director.

6. The method of claim 1, wherein the general offset is applied for all communication channels for which the set of antennas are used.

7. The method of claim 1, wherein
the fine tilt director provides an adjustment in digital domain radio frequency (RF) processing, or
the fine tilt director provides an adjustment in digital domain intermediate frequency (IF) processing.

8. The method of claim 1, wherein the tilt is a vertical tilt.

9. The method of claim 1, wherein the fixed number of tilts is less than ten.

10. The method of claim 1, wherein the set of antennas form part of an active antenna system.

11. The method of claim 1, wherein the tilt is applied for all communication channels for which the set of antennas are used.

12. The method of claim 1, wherein the method is repeated for a plurality of sets of antennas, whereby different resulting tilts are provided for different sets of antennas.

13. A tilt configurer for configuring a tilt of a set of antennas of an antenna site for a radio communication system, the tilt configurer comprising:
a processor; and
a memory storing instructions that, when executed by the processor, cause the tilt configurer to:
obtain a desired tilt;
configure a coarse tilt director, being configurable to provide only a fixed number of tilts for the set of antennas, to provide a coarse tilt being closest to the desired tilt, wherein the set of antennas comprises a first column of antenna elements and a second column of antenna elements, the first column of antenna elements comprising a first sub-array of antenna elements and a second sub-array antenna elements, the second column of antenna elements comprising a third sub-array of antenna elements and a fourth sub-array antenna elements, the phase center of the first sub-array of antenna elements and the phase center of the second sub-array of antenna elements is spaced apart more than $\lambda/2$ in a vertical domain, the phase center of the third sub-array of antenna elements and the phase center of the fourth sub-array of antenna elements is spaced apart more than $\lambda/2$ in the vertical domain, and $\lambda$ is a predetermined wavelength; and configure a fine tilt director, being configurable more finely than the coarse tilt director, to provide a fine tilt such that a resulting tilt for the set of antennas, being a combination of the coarse tilt and the fine tilt, corresponds to the desired tilt, wherein the fine tilt director is configured to provide a general offset to a digital domain beamforming calculation in baseband processing, and the tilt configurer is further configured to apply the general offset for a communication channel for which the set of antennas is used.

14. The tilt configurer of claim 13, wherein the coarse tilt director is an analogue tilt director.

15. The tilt configurer of claim 14, wherein the coarse tilt director is based on configuring the tilt for the set of antennas by different phase shifts.

16. The tilt configurer of claim 14, wherein the coarse tilt director comprises a set of selectively applied time delay elements.

17. The tilt configurer of claim 13, wherein the fine tilt director is a digital domain tilt director.

18. The tilt configurer of claim 17, wherein the general offset is applied for all communication channels for which the set of antennas are used.

19. The tilt configurer of claim 17, wherein the fine tilt director provides an adjustment in digital domain radio frequency (IF) processing, or the fine tilt director provides an adjustment in digital domain intermediate frequency (IF) processing.

20. A computer program product comprising a non-transitory computer readable medium storing a computer program for configuring a tilt of a set of antennas of an antenna site for a radio communication system, the computer program comprising computer program code which, when run on a tilt configurer causes the tilt configurer to:

obtain a desired tilt;

configure a coarse tilt director, being configurable to provide only a fixed number of tilts for the set of antennas, to provide a coarse tilt being closest to the desired tilt, wherein the set of antennas comprises a first column of antenna elements and a second column of antenna elements, the first column of antenna elements comprising a first sub-array of antenna elements and a second sub-array antenna elements, the second column of antenna elements comprising a third sub-array of antenna elements and a fourth sub-array antenna elements, the phase center of the first sub-array of antenna elements and the phase center of the second sub-array of antenna elements is spaced apart more than $\lambda/2$ in a vertical domain, the phase center of the third sub-array of antenna elements and the phase center of the fourth sub-array of antenna elements is spaced apart more than $\lambda/2$ in the vertical domain, and $\lambda$ is a predetermined wavelength; and configure a fine tilt director, being configurable more finely than the coarse tilt director, to provide a fine tilt such that a resulting tilt for the set of antennas, being a combination of the coarse tilt and the fine tilt, corresponds to the desired tilt, wherein the fine tilt director is configured to provide a general offset to a digital domain beamforming calculation in baseband processing, and the tilt configurer is further configured to apply the general offset for a communication channel for which the set of antennas is used.

\* \* \* \* \*